United States Patent
Sarkar et al.

(10) Patent No.: US 9,560,610 B2
(45) Date of Patent: Jan. 31, 2017

(54) MONITORING OF RADIO LINK SYNCHRONIZATION IN A USER EQUIPMENT'S ACTIVE SET

(71) Applicant: TELEFONAKTIEBOLAGET L M ERICSSON (PUBL), Stockholm (SE)

(72) Inventors: Debasish Sarkar, Irvine, CA (US); Ayan Sen, Gurgaon (IN); Manmohan Munjal, Gurgaon (IN); Jaspal Singh, Gurgaon (IN)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 166 days.

(21) Appl. No.: 14/267,396

(22) Filed: May 1, 2014

(65) Prior Publication Data
US 2015/0319722 A1 Nov. 5, 2015

(51) Int. Cl.
H04W 56/00 (2009.01)
H04W 76/00 (2009.01)
H04W 76/06 (2009.01)
H04W 36/00 (2009.01)

(52) U.S. Cl.
CPC ......... *H04W 56/00* (2013.01); *H04W 36/0083* (2013.01); *H04W 76/00* (2013.01); *H04W 76/06* (2013.01)

(58) Field of Classification Search
None
See application file for complete search history.

(56) References Cited

U.S. PATENT DOCUMENTS

2004/0259547 A1* 12/2004 Lau .................. H04W 36/30
                                                      455/436
2013/0053052 A1  2/2013 Ke et al.
2014/0287755 A1* 9/2014 Lim .................. H04W 36/0083
                                                      455/436
2014/0287759 A1* 9/2014 Purohit ............. H04W 56/0015
                                                      455/437
2014/0295860 A1* 10/2014 Kuo ..................... H04W 24/02
                                                      455/450

OTHER PUBLICATIONS

3GPP TSG RAN WG3 Meeting #66, R3-093042, RL Restore/Failure Indication after the transmission & reception of indicator for deactivation/reactivation of secondary carrier, Nokia Siemens Network, Nokia, Jeju, South Korea, Nov. 9-13, 2009.
3GPP TSG RAN WG1 Meeting #73, R1-132704, TP for Section 7.1.2 and 7.1.3 on potential solutions in 7.1 Solutions for Co-channel Scenarios, Nokia Siemens Networks, Qualcomm, Huawei, Ericsson, Fukuoka, Japan, May 20-24, 2013.

* cited by examiner

*Primary Examiner* — Huy D Vu
*Assistant Examiner* — Bao G Nguyen

(57) ABSTRACT

A method and arrangement in a Radio Network Controller (RNC) for monitoring radio link (RL) synchronization for each RL as soon as it is added to a User Equipment's (UE's) Active Set. When a new RL is added, each RL in the Active Set sends an Active Set Update Complete message to the RNC. When the RNC determines that a Radio Link Restore Indication message is not received from the Target NodeB serving the new RL, the RNC starts an initRlSyncT timer set for a defined time period and monitors incoming messages to determine whether the Radio Link Restore Indication message is received for the new RL before the initRlSyncT timer expires. If so, the method ends; but if not, the RNC instructs associated NodeBs and the UE to remove the new RL from the UE's Active Set.

16 Claims, 5 Drawing Sheets

MONITORING OF RADIO LINK SYNCHRONIZATION IN A USER EQUIPMENT'S ACTIVE SET

TECHNICAL FIELD

The present disclosure relates to radio telecommunication systems and, more particularly, to a method and Radio Network Controller (RNC) for monitoring radio link (RL) synchronization in a User Equipment's (UE's) Active Set.

BACKGROUND

While performing a new Radio Link (RL) addition to a UE's Active Set (AS) following a Wideband Code Division Multiple Access (WCDMA) Event 1a or 1c, the newly added RL might not achieve complete synchronization in the uplink (UL) or downlink (DL) or both, although an RRC Active Set Update Complete message may be received by the Radio Network Controller (RNC) through the other synchronized RLs in the Active Set.

In the existing methodology of RL addition, when a UE requests the addition of a new RL by sending a Radio Resource Control RRC Measurement Report, the RNC evaluates a handover proposal and if successful, sends a NodeB Application Protocol (NBAP) Radio Link Setup Request to the target NodeB to configure the particular RL. Once the RNC receives an NBAP Radio Link Setup Response message, the RNC transmits the RRC Active Set Update message and waits for the RRC Active Set Update Complete message from all the pre-existing RLs in the Active Set. However, the RNC does not wait for an NBAP Radio Link Restore Indication to arrive indicating whether the newly added RL has achieved synchronization. As a result, the newly added RL may remain in the Active Set without achieving synchronization unless it becomes the Serving Cell and a Radio Connection Supervision (RCS) mechanism is triggered for this particular RL.

In the current implementation, it has often been observed that after a new RL has been added to a UE's Active Set either as a result of event 1a or 1c, the UE sends an RRC Active Set Update Complete message without achieving UL synchronization for the newly added RL. This can be established from the fact that no NBAP Radio Link Restore Indication message was received from the Target NodeB for the newly added RL. The RRC Active Set Update message corresponding to this new RL is transmitted by all the RLs and the RRC Active Set Update Complete message is received by the RNC from all the old RLs in the Active Set except the newly added one (which has not achieved synchronization).

Subsequently, an addition/replacement process for an additional new RL may be initiated. An RRC Active Set Update (Addition) message is transmitted to add the new RL, and synchronization for the newly added RL is also confirmed upon reception by the RNC of an NBAP Radio Link Restore Indication message. However, the RL which was added prior to this new RL addition procedure continues to remain unsynchronized. This can be confirmed by checking the RLS_TAG corresponding to this RL in the Internal RC Supervision message. As a result, the RRC Active Set Update Complete message is not received by all the RLs present in the current Active Set. Consequently, the RNC does not consider the Active Set Update procedure to be completed and waits for the same to arrive via all existing RLs until an Active Set Update Timer expires.

After expiry of the Active Set Update Timer (which may range for example, from 5-15 seconds), the UE's call is released. This occurs irrespective of the fact that the serving RL had adequate signal strength to sustain the call. Any RRC Measurement Report sent by the UE in the meantime will be buffered during this duration (wait period for RRC Active Set Update Complete message) and will not be evaluated. As a result, any valid candidate cell that was reported for addition/replacement could not be evaluated thereby missing the opportunity to add a stronger cell to the Active Set. Thus, the unsynchronized RL consumes physical resources such as channel element, codes, and DL power without providing any gain to the call.

This issue has severe impact on High-Speed Downlink Packet Access (HSDPA) calls as well. A new RL is added to the Active Set, but does not become the serving High-Speed Downlink Shared Channel (HS-DSCH) cell initially. The RRC Active Set Update message is transmitted on the downlink, and the RRC Active Set Update Complete message is received. However, the newly added RL could not achieve UL Synchronization, and no NBAP Radio Link Restore Indication message is received by the RNC for this specific RL. At a later stage, when this new RL (still having unsynchronized UL) becomes a candidate for the best cell, event 1d is reported by the UE. Accordingly, this RL becomes the serving HS-DSCH cell and the RCS supervision starts. After expiry of a HsDschRclostT timer, the connection is released.

SUMMARY

The existing procedures thus cause several problems. The unsynchronized (UL) RL in the Active Set is leading to Active Set Update failure at a later stage since the Active Set Update Complete message is not being received on the UL by all existing Active Set members. This eventually leads to a dropped call even though the unsynchronized RL is not the strongest server in the Active Set. As a consequence of the above phenomenon, during the time when the RNC is waiting to receive the Active Set Update Complete message, any RRC Measurement Report messages for a new cell addition or replacement are buffered and are not evaluated. As a result, strong candidates are not evaluated in time. Additionally, physical downlink resources (such as channel elements, codes, and DL power) are being wasted without achieving any gain on the uplink. For a (HSDPA) call, this leads to an overall connection release once the unsynchronized RL becomes the best server and the RCS process is triggered.

The Applicant has noted that the above mentioned problems can be avoided utilizing an arrangement in an RNC to detect the unsynchronized RL and act upon it as soon as it is added to the Active Set. The present disclosure introduces an arrangement in the RNC that monitors RL synchronization for each RL as soon as it is added to the Active Set instead of waiting until the RL becomes the best cell in the Active Set thereby triggering the RCS mechanism.

According to one embodiment, a method in an RNC is disclosed for monitoring RL synchronization in a user equipment's active set having a plurality of RLs. The method includes adding a new RL to the user equipment's active set; detecting that the new RL did not synchronize within a defined time period; and removing the new RL from the user equipment's active set in response to detecting that the new RL did not synchronize within the defined time period.

In one embodiment, the detecting is performed by detecting that a Radio Link Restore Indication is not received for the new RL when pre-existing RLs have sent Active Set Update Complete messages; and in response to detecting that the Radio Link Restore Indication was not received for the new RL, monitoring RL synchronization of the new RL even though the new RL does not have the highest signal quality of the plurality of RLs in the active set. In a further embodiment, monitoring includes starting an initRlSyncT timer set for the defined time period; and determining whether the Radio Link Restore Indication is received for the new RL before the initRlSyncT timer expires. If so, the method ends; but if not, the RNC removes the new RL from the user equipment's active set.

In another embodiment, an RNC is disclosed, wherein the RNC is configured to monitor RL synchronization in a user equipment's active set having a plurality of RLs. The RNC includes a non-transitory memory for storing computer program instructions; a processor coupled to the memory and configured to control the RNC when executing the computer program instructions. The processor controls a RL addition unit configured to add a new RL to the user equipment's active set; a confirmation unit configured to detect that the new RL did not synchronize within a defined time period; and a RL removal unit configured to remove the new RL from the user equipment's active set in response to the confirmation unit detecting that the new RL did not synchronize within the defined time period.

In another embodiment, a computer program product is disclosed, wherein the computer program product comprises software instructions stored on a non-transitory, computer-readable medium in a Radio Network Controller (RNC). When the software instructions are executed by one or more processors, the RNC is caused to monitor RL synchronization in a user equipment's active set having a plurality of RLs by performing the following: adding a new RL to the user equipment's active set; detecting that the new RL did not synchronize within a defined time period; and removing the new RL from the user equipment's active set in response to detecting that the new RL did not synchronize within the defined time period.

The method and RNC of the present disclosure provide several benefits. For example, the use of valuable RAN resources such as channel elements, codes, and power is optimized by eliminating unsynchronized Radio Links more quickly after they are added to the Active Set. By removing unsynchronized Radio Links more quickly, adverse impacts on the subsequent RL Addition/Replacement procedure can be avoided to a large extent. This helps in improving retainability (reduced drops due to non-receipt of the Active Set Update Complete message from all existing RLs in the Active Set) as well as mobility performance. For EUL/HS calls, the method and arrangement also help in optimizing RAN resources consumed due to EUL non-serving cell resource allocation. HS retainability is also improved by performing the RCS procedure whenever any new RL is added to the Active Set. This removes any unsynchronized RL from the Active Set before the RL becomes the active server and subsequently leads to an overall connection release due to failed UL synchronization.

Further features and benefits of embodiments of the invention will become apparent from the detailed description below.

BRIEF DESCRIPTION OF THE DRAWINGS

In the following section, the invention will be described with reference to exemplary embodiments illustrated in the figures, in which.

DETAILED DESCRIPTION

Figure 1:
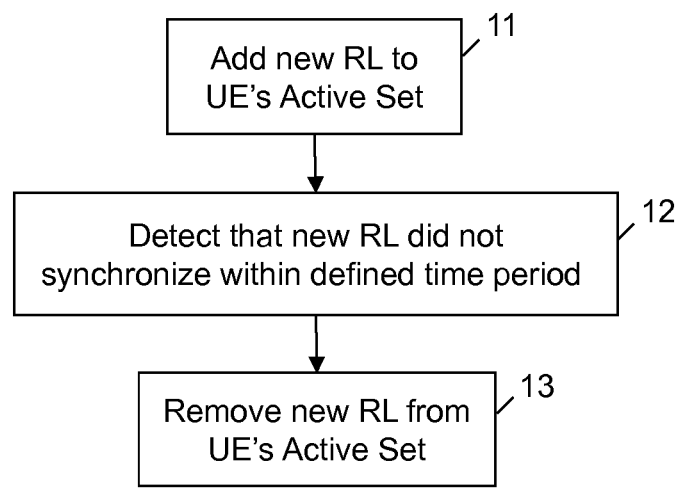
FIG. 1 is a flow chart illustrating an exemplary embodiment of a method in a Radio Network Controller (RNC) for monitoring radio link (RL) synchronization in a UE's active set.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements. Additionally, it should be understood that the invention can be implemented in hardware or a combination of software stored on a non-transitory memory and executed by a general purpose computer or microprocessor.

FIG. 1 is a flow chart illustrating an exemplary embodiment of a method in a Radio Network Controller (RNC) 18 for monitoring radio link (RL) synchronization in a user equipment's active set having a plurality of RLs. At step 11, a new RL is added to the UE's active set. At step 12, the RNC detects that the new RL did not synchronize within a defined time period. At step 13, the new RL is removed from the UE's active set in response to detecting that the new RL did not synchronize within the defined time period.

Figure 2:
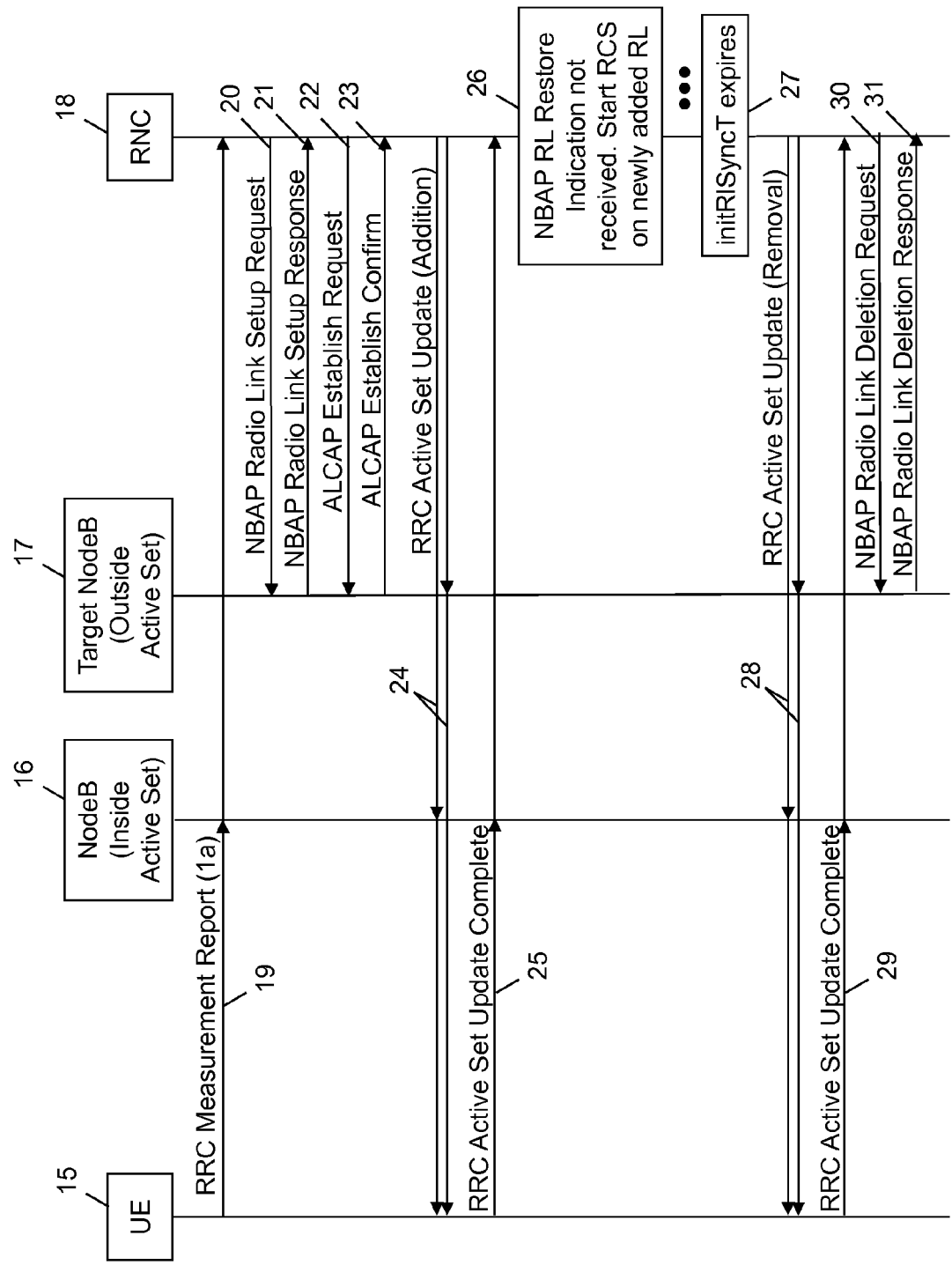
FIG. 2 is a message flow diagram showing an exemplary embodiment of a method performed following unsuccessful synchronization of a newly added RL in a UE's Active Set.

FIG. 2 is a message flow diagram showing an exemplary embodiment of a process performed following unsuccessful synchronization of a newly added RL in a UE's Active Set. Various messages are exchanged between a UE 15, a NodeB 16 inside the Active Set, a Target NodeB 17 outside the Active Set, and the RNC 18. The RNC may trigger RL Supervision as soon as a new RL is added to the Active Set.

The UE sends an RRC Measurement Report (1a) 19 to the NodeB 16, which forwards the report to the RNC 18. The RNC sends an NBAP Radio Link Setup Request 20 to the target NodeB 17, and the Target NodeB returns an NBAP Radio Link Setup Response message 21 corresponding to the new RL to be added. The RNC and the Target NodeB also exchange an ALCAP Establish Request message 22 and an ALCAP Establish Confirm message 23. Once the RNC receives the NBAP Radio Link Setup Response message 21, the RNC sends an RRC Active Set Update (Addition) message 24 to the NodeB 16 and the Target NodeB 17, which forward the message to the UE 15 to add the proposed RL to the Active Set. All pre-existing RLs in the Active Set return an RRC Active Set Update Complete message 25 to the NodeB 16, which forwards the message to the RNC.

At block 26, the RNC 18 determines that an NBAP Radio Link Restore Indication corresponding to the newly added RL has not been received from the Target NodeB 17. Consequently, the RNC may trigger the RCS mechanism for this newly added RL, even when the newly added RL is not yet the best server. The RL may initially be tagged as "Out of Sync", and a new user-configurable timer (initRlSyncT)

for monitoring newly added RLs to the Active Set is initiated. If, nlnSyncInd number of good frames (having BLER<35%) are received by the Target NodeB 17, the target NodeB then sends the NBAP Radio Link Restore Indication to the RNC indicating the RL has achieved UL Synchronization. If this occurs before expiration of the initRlSyncT timer at block 27, the timer is stopped and the RL becomes synchronized. However, when the initRlSyncT timer expires at block 27 before nlnSyncInd number of good frames are received by the Target NodeB (and consequently the Target NodeB does not send the NBAP Radio Link Restore Indication to the RNC), the newly added RL may be declared unsynchronized and subsequently removed.

Removal of the newly added RL is accomplished by sending an RRC Active Set Update (Removal) message 28 from the RNC 18 to the NodeB 16 and the Target NodeB 17, which forward the message to the UE 15 indicating removal of the newly added RL from the Active Set. The UE returns an RRC Active Set Update Complete message 29. The RNC then sends an NBAP Radio Link Deletion Request message 30 to the Target NodeB 17 (having the UL unsynchronized RL) indicating removal of the corresponding resources. The Target NodeB returns an NBAP Radio Link Deletion Response message 31 to the RNC.

It should be noted that the defined time period of the initRlSyncT timer is shorter than an Active Set Update timer that defines a time at which the RNC determines that adding the new RL has failed and a call associated with the UE is released. Thus, removing the new RL when the initRlSyncT timer expires prevents the call from being eventually released due to expiry of the Active Set Update timer.

Figure 3A:
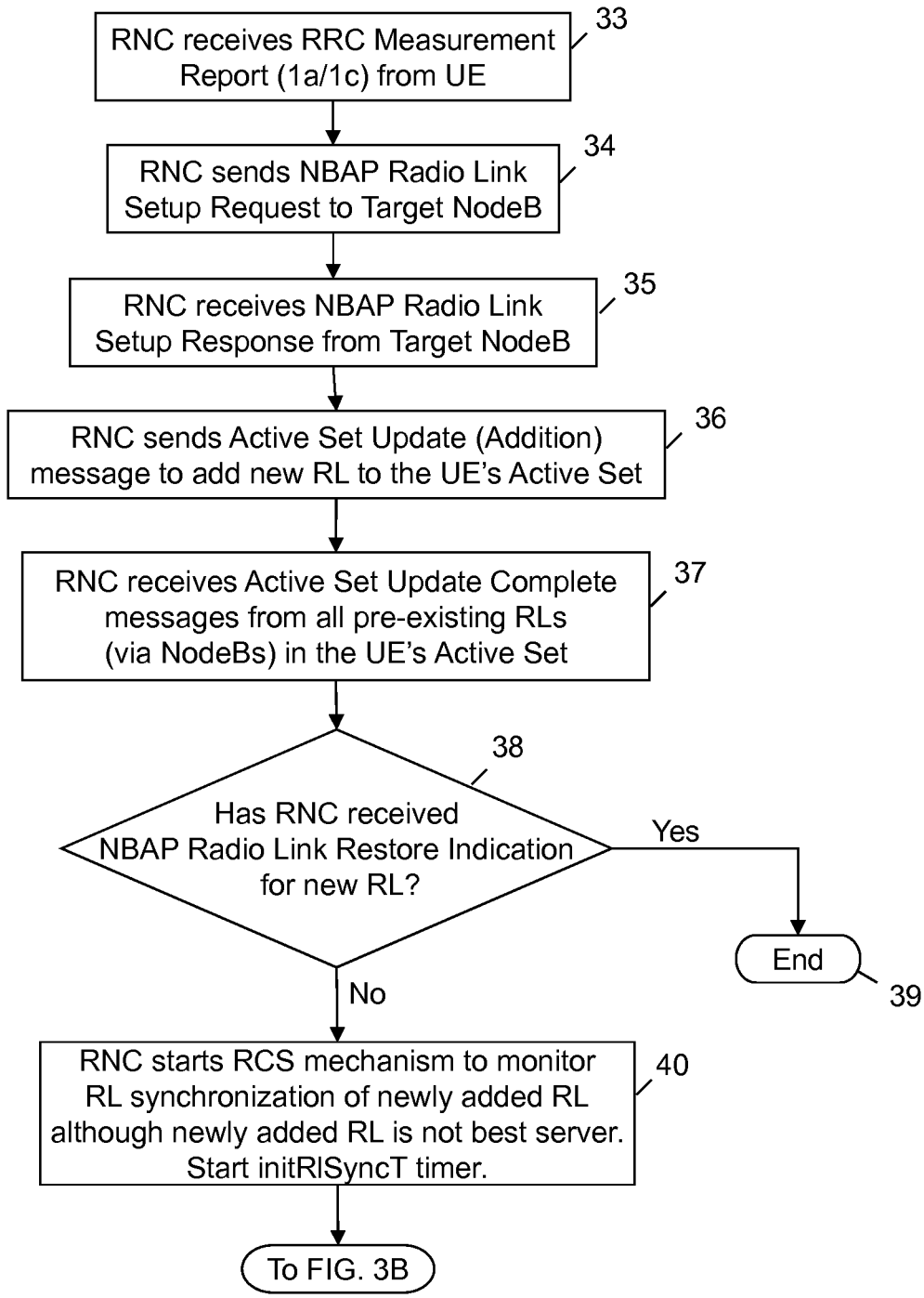
FIGS. 3A-3B are portions of a more detailed flow chart of an exemplary embodiment of the method of the present disclosure.
Figure 3B:
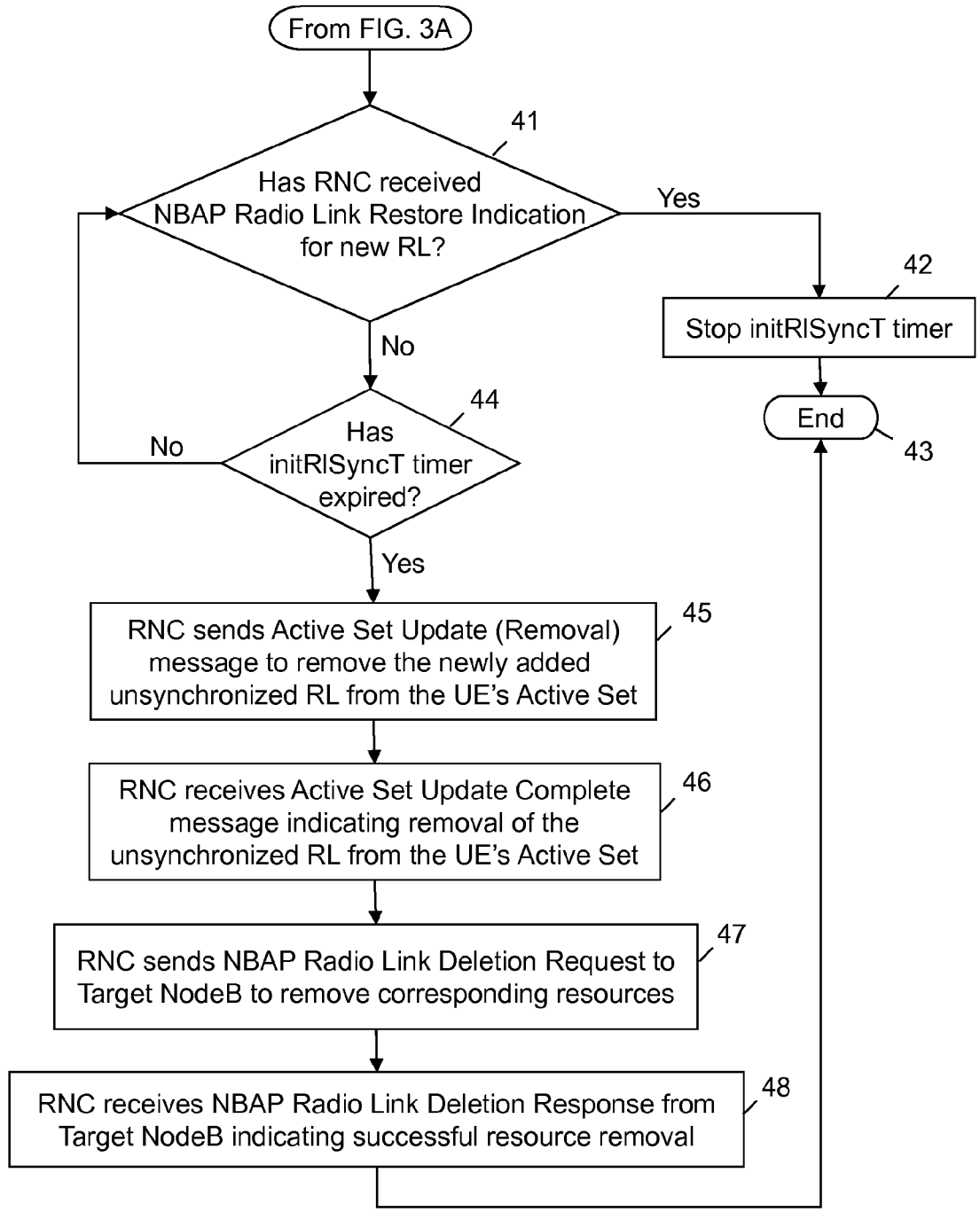

FIGS. 3A-3B are portions of a more detailed flow chart of an exemplary embodiment of the method of the present disclosure. At step 33, the RNC 18 receives the RRC Measurement Report (1a/1c) from the UE 15. At step 34, the RNC sends the NBAP Radio Link Setup Request 20 to the target NodeB 17, and at step 35 the RNC receives the NBAP Radio Link Setup Response message 21 from the Target NodeB. At step 36, the RNC sends the RRC Active Set Update (Addition) message 24 to the NodeB 16 and the Target NodeB 17, which forward the message to the UE 15 to add the proposed RL to the Active Set. At step 37, the RNC receives the RRC Active Set Update Complete message 25 from all pre-existing RLs in the Active Set.

At step 38, the RNC 18 determines whether the NBAP Radio Link Restore Indication message corresponding to the newly added RL has been received from the Target NodeB 17. If so, the newly added RL is synchronized and the method ends at step 39. If not, the method moves to step 40 where the RNC may trigger the RCS mechanism for this newly added RL, even when the newly added RL is not yet the best server. The RL may initially be tagged as "Out of Sync", and the new user-configurable initRlSyncT timer for monitoring newly added RLs to the Active Set is initiated. The method then moves to step 3B.

At step 41, the RNC continues to monitor whether it has received the NBAP Radio Link Restore Indication corresponding to the newly added RL for the duration of the initRlSyncT timer. When the RNC receives the NBAP Radio Link Restore Indication before expiration of the initRlSyncT timer, the method moves to step 42 where the timer is stopped and the method ends at step 43. However, when the RNC has not received the NBAP Radio Link Restore Indication, the method moves to step 44 and determines whether the initRlSyncT timer has expired. If, not, the method returns to step 41. If the timer has expired, the method moves to step 45 where the newly added RL may be declared unsynchronized.

At step 45, the RNC 18 sends the RRC Active Set Update (Removal) message 28 to the NodeB 16 and the Target NodeB 17, which forward the message to the UE 15 indicating removal of the newly added RL from the Active Set. At step 46, the RNC receives from the UE, an RRC Active Set Update Complete message 29 indicating removal of the unsynchronized RL from the UE's Active Set. At step 47, the RNC sends the NBAP Radio Link Deletion Request message 30 to the Target NodeB 17 (having the UL unsynchronized RL) indicating removal of the corresponding resources. At step 48, the RNC receives from the Target NodeB, the NBAP Radio Link Deletion Response message 31 indicating successful removal of the resources corresponding to the removed RL. The method then ends at step 43.

Once again, the defined time period of the initRlSyncT timer is shorter than the Active Set Update timer that defines the time at which the RNC determines that adding the new RL has failed and the call associated with the UE is released. Thus, removing the new RL when the initRlSyncT timer expires prevents the call from being eventually released due to expiry of the Active Set Update timer.

Figure 4:
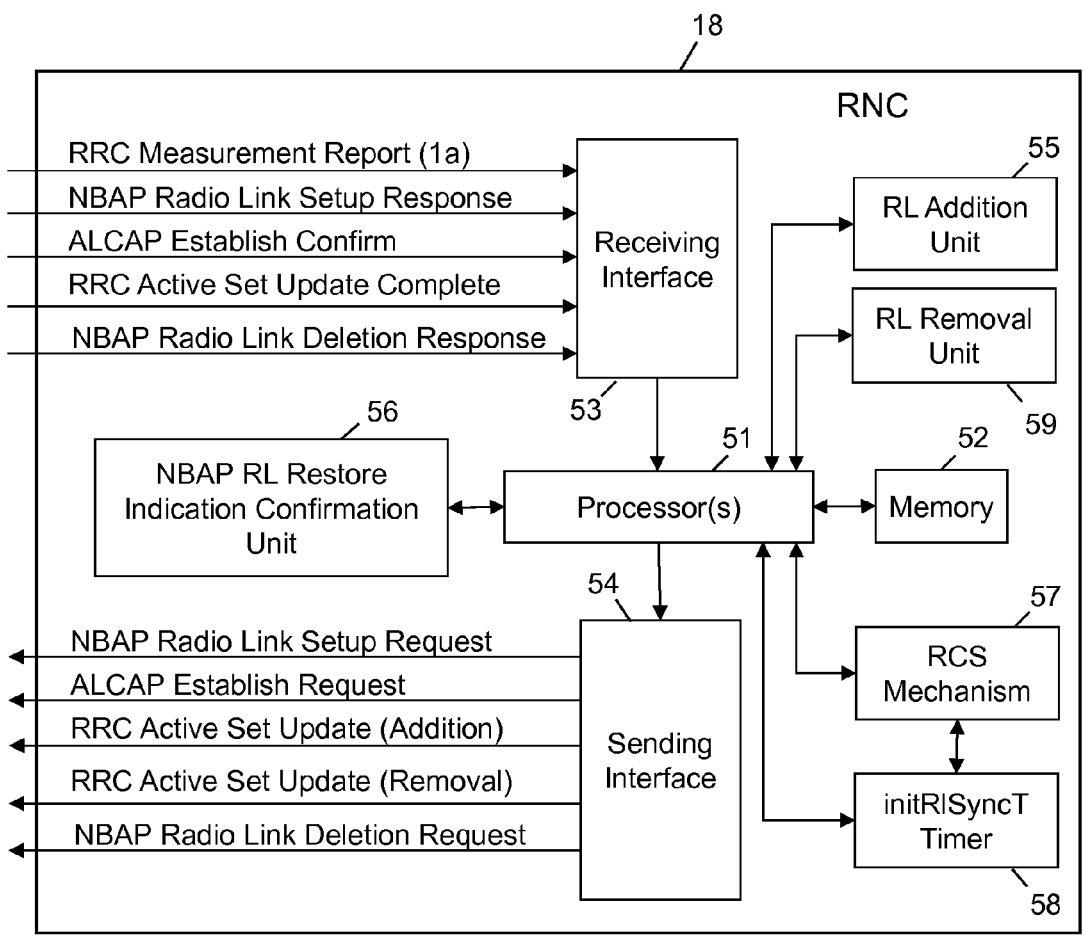
FIG. 4 is a simplified block diagram of an RNC illustrating an exemplary arrangement for monitoring RL synchronization in a UE's Active Set.

FIG. 4 is a simplified block diagram of an RNC 18 illustrating an exemplary arrangement for monitoring RL synchronization in a UE's Active Set. The arrangement may be controlled by one or more processor(s) 51 executing computer program instructions stored on a memory 52. A receiving interface 53 receives various messages from the UE 15, the NodeB 16 inside the Active Set, and the Target NodeB 17 outside the Active Set, as shown in FIG. 2. Likewise, a sending interface 54 sends the various messages as shown in FIG. 2 to the UE, the NodeB inside the Active Set, and the Target NodeB outside the Active Set.

The processor 51 controls an RL Addition Unit 55 to add a new RL to the UE's Active Set. An NBAP RL Restore Indication Confirmation Unit 56 determines whether an NBAP Radio Link Restore Indication has been received for the new RL when the RNC receives an RRC Active Set Update Complete message from all of the pre-existing RLs in the Active Set. If not, an RCS Mechanism 57 is started in order to monitor RL synchronization of the newly added RL even when the newly added RL is not the best server. An initRlSyncT timer 58 is also started to time the monitoring period. If the NBAP RL Restore Indication Confirmation Unit 56 determines that an NBAP Radio Link Restore Indication is received for the new RL before the initRlSyncT timer expires, the timer is stopped and monitoring of the new RL synchronization ends. If the NBAP RL Restore Indication Confirmation Unit 56 determines that an NBAP Radio Link Restore Indication is not received for the new RL before the initRlSyncT timer expires, the processor triggers an RL Removal Unit 59 to remove the unsynchronized new RL from the UE's Active Set. The sending interface 54 sends the RRC Active Set Update (Removal) message 28, and when the RRC Active Set Update Complete message 29 is received, the sending interface sends the NBAP Radio Link Deletion Request 30 to the Target NodeB 17 to remove corresponding resources.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method in a Radio Network Controller (RNC) for monitoring radio link (RL) synchronization in a user equipment's active set having a plurality of RLs, the method comprising:
adding a new RL to the user equipment's active set;
detecting that the new RL did not synchronize by detecting that a Radio Link Restore Indication is not received for the new RL;
in response to detecting that the Radio Link Restore Indication was not received for the new RL, monitoring RL synchronization of the new RL for a defined period of time, the monitoring comprising starting an initRlSyncT timer set for the defined time period, and determining whether the Radio Link Restore Indication is received for the new RL before the initRlSyncT timer expires; and
removing the new RL from the user equipment's active set in response to detecting that the new RL did not synchronize within the defined time period,
wherein the defined time period of the initRlSyncT timer is shorter than an Active Set Update timer that defines a time at which the RNC determines that adding the new RL has failed and a call associated with the user equipment is released, wherein removing the new RL when the initRlSyncT timer expires prevents the call from being eventually released due to expiry of the Active Set Update timer.

2. The method according to claim 1, wherein RL synchronization of the new RL is monitored even though the new RL does not have the highest signal quality of the plurality of RLs in the active set.

3. The method according to claim 1, further comprising stopping the initRlSyncT timer and ending the method, upon determining that the Radio Link Restore Indication is received for the new RL before the initRlSyncT timer expires.

4. The method according to claim 1, wherein removing includes sending an Active Set Update message to selected NodeBs in the radio network to remove the new RL from the user equipment's active set, upon determining that the Radio Link Restore Indication is not received for the new RL before the initRlSyncT timer expires.

5. The method according to claim 4, wherein sending the Active Set Update message to selected NodeBs includes sending the Active Set Update message to NodeBs controlling existing RLs in the active set and to a target NodeB controlling the new RL.

6. The method according to claim 1, further comprising sending a Radio Link Deletion Request to the target NodeB to remove resources associated with the new RL.

7. A Radio Network Controller (RNC) configured to monitor radio link (RL) synchronization in a user equipment's active set having a plurality of RLs, the RNC comprising:
a non-transitory memory for storing computer program instructions;
a processor coupled to the memory and configured to control the RNC when executing the computer program instructions, wherein the processor controls:
a RL addition unit configured to add a new RL to the user equipment's active set;
a confirmation unit configured to detect that the new RL did not synchronize by detecting that a Radio Link Restore Indication is not received for the new RL;
a Radio Connection Supervision (RCS) mechanism configured to monitor RL synchronization of the new RL for a defined time period;
an initRlSyncT timer set for the defined time period, wherein the RCS mechanism is configured to start the initRlSyncT timer, and determine whether the Radio Link Restore Indication is received for the new RL before the initRlSyncT timer expires; and
a RL removal unit configured to remove the new RL from the user equipment's active set in response to the confirmation unit detecting that the new RL did not synchronize within the defined time period,
wherein the defined time period of the initRlSyncT timer is shorter than an Active Set Update timer that defines a time at which the RNC determines that adding the new RL has failed and a call associated with the user equipment is released, wherein removing the new RL when the initRlSyncT timer expires prevents the call from being eventually released due to expiry of the Active Set Update timer.

8. The RNC according to claim 7, wherein:
the RCS mechanism monitors RL synchronization of the new RL even though the new RL does not have the highest signal quality of the plurality of RLs in the active set.

9. The RNC according to claim 7, wherein the RNC is configured to stop the initRlSyncT timer and end the method, upon determining that the Radio Link Restore Indication is received for the new RL before the initRlSyncT timer expires.

10. The RNC according to claim 7, wherein the RNC is configured to send an Active Set Update message to selected NodeBs in the radio network to remove the new RL from the user equipment's active set, upon determining that the Radio Link Restore Indication is not received for the new RL before the initRlSyncT timer expires.

11. The RNC according to claim 10, wherein the RNC is configured to send the Active Set Update message to NodeBs controlling existing RLs in the active set and to a target NodeB controlling the new RL.

12. The RNC according to claim 7, wherein the RNC is further configured to send a Radio Link Deletion Request to the target NodeB to remove resources associated with the new RL.

13. A computer program product comprising software instructions stored on a non-transitory, computer-readable medium in a Radio Network Controller (RNC), wherein when the software instructions are executed by one or more processors, the RNC is caused to monitor radio link (RL) synchronization in a user equipment's active set having a plurality of RLs by performing the following:
adding a new RL to the user equipment's active set;
detecting that the new RL did not synchronize by detecting that a Radio Link Restore Indication is not received for the new RL;
in response to detecting that the Radio Link Restore Indication was not received for the new RL, monitoring RL synchronization of the new RL for a defined period of time, wherein the monitoring comprises starting an initRlSyncT timer set for the defined time period, and determining that the Radio Link Restore Indication is not received for the new RL before the initRlSyncT timer expires; and
removing the new RL from the user equipment's active set in response to detecting that the new RL did not synchronize within the defined time period, wherein the defined time period of the initRlSyncT timer is shorter than an Active Set Update timer that defines a time at which the RNC determines that adding the new RL has failed and a call associated with the user equipment is released, wherein removing the new RL when the initRlSyncT timer expires prevents the call from being eventually released due to expiry of the Active Set Update timer.

14. The computer program product according to claim 13, wherein a portion of the software instructions monitor RL synchronization of the new RL even though the new RL does not have the highest signal quality of the plurality of RLs in the active set.

15. The computer program product according to claim 13, wherein a portion of the software instructions for removing the new RL causes the RNC to:
   send to NodeBs controlling existing RLs in the active set and to a target NodeB controlling the new RL, an Active Set Update message to remove the new RL from the user equipment's active set.

16. The computer program product according to claim 13, wherein the RNC is further configured to send a Radio Link Deletion Request to the target NodeB to remove resources associated with the new RL.

* * * * *